United States Patent [19]
Brady et al.

[11] Patent Number: 5,605,960
[45] Date of Patent: Feb. 25, 1997

[54] MELT-PROCESSED BLENDS CONTAINING POLY(VINYL ALCOHOL)

[75] Inventors: Jean M. Brady, Hamilton, N.J.; Thierry C. C. Diaz, Roquefort les Pins, France

[73] Assignee: Rohm and Haas Company, Philadelphia, Pa.

[21] Appl. No.: 605,481

[22] Filed: Feb. 26, 1996

Related U.S. Application Data

[63] Continuation-in-part of Ser. No. 412,434, Mar. 29, 1995, abandoned.

[51] Int. Cl.$^6$ .................................................. C08L 29/04
[52] U.S. Cl. ........................... 525/57; 525/80; 525/84; 525/85; 525/86; 525/902
[58] Field of Search ................... 525/57, 902, 80, 525/84, 85, 86

[56] References Cited

U.S. PATENT DOCUMENTS

| | | | |
|---|---|---|---|
| 3,833,686 | 9/1974 | Grochowski et al. | 260/876 |
| 4,086,296 | 4/1978 | Carty et al. | 260/857 |
| 5,147,930 | 9/1992 | LaFleur et al. | 525/57 |
| 5,189,097 | 2/1993 | LaFleur et al. | 525/57 |
| 5,208,083 | 5/1993 | Freed | 428/367 |
| 5,296,537 | 3/1994 | LaFleur et al. | 528/57 |
| 5,322,892 | 6/1994 | LaFleur et al. | 525/57 |
| 5,362,801 | 11/1994 | Amici et al. | 525/57 |
| 5,362,802 | 11/1994 | Amici et al. | 525/57 |
| 5,362,803 | 11/1994 | LaFleur et al. | 525/57 |
| 5,378,758 | 1/1995 | Amici et al. | 525/57 |
| 5,378,759 | 1/1995 | Amici et al. | 525/57 |
| 5,389,724 | 2/1995 | LaFleur et al. | 525/57 |

*Primary Examiner*—W. Robinson H. Clark
*Attorney, Agent, or Firm*—Roger K. Graham

[57] ABSTRACT

Polymers containing a high percentage of vinyl alcohol units are difficult to process into sheet, film, injection-molded objects, or fibers. Such melt-processing is greatly enhanced by admixing certain core/shell copolymers having either a rubbery, crosslinked core mainly formed from polymerization of butadiene and/or of an alkyl acrylate, or a non-crosslinked core derived mainly of units derived from an alkyl acrylate, and an outer shell mainly formed from polymerization of methyl methacrylate. Such copolymers do not require the presence of functional groups capable of reaction with the hydroxyl groups of the poly(vinyl alcohol) to impart the improved processing.

2 Claims, No Drawings

MELT-PROCESSED BLENDS CONTAINING POLY(VINYL ALCOHOL)

This is a continuation-in-part of application U.S. Pat. Ser. No. 08/412,434, filed Mar. 29, 1995, now abandoned.

This invention relates to melt-processed blends of polymers containing a high percentage of vinyl alcohol units blended with certain non-functionalized, non-reactive core/shell copolymers. Further relates to melt-processed blends of these polymers in the form of sheet, film, injection-molded objects, fibers and other formed objects.

Of all the synthetic polymers considered as materials with useful gas permeation properties, such as resistance to passage of oxygen, carbon dioxide, water, and the like, poly(vinyl alcohol) (PVOH), a polymer made up of units of the structure.

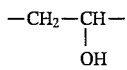

and generally prepared by the total hydrolysis of homopolymers of vinyl acetate or related vinyl esters, the starting polymer made up of units of the structure

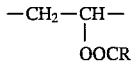

where R is alkyl, that is, from one to eight carbon atoms, preferably methyl, ranks as the most impervious to the passage of small molecules. PVOH exhibits this property because of the high cohesive energy density and polarity of the hydroxyl groups. The presence of the network of hydroxyl groups has the concomitant effect of rendering the polymer (PVOH) impermeable to gases, but sensitive to moisture. The strong intermolecular interaction resulting from the high polarity of the —OH functional group gives rise to a melting temperature in the vicinity of the degradation temperature of PVOH. Consequently, melting is accompanied by degradation. The degradation is so severe that PVOH by itself cannot either be melt extruded or injection molded.

The above limitations were surmounted to some degree by various approaches discussed in the below-discussed La Fleur patents, but these approaches have the concomitant effects of significantly increasing the permeability of the resin to small molecules and reducing the stiffness and heat distortion temperature of the resin. Thus there exists a need for a means to allow melt-processing of polymers of high vinyl alcohol content, such as fully hydrolyzed or highly hydrolyzed polymers of vinyl esters, into useful objects maintaining most of the barrier properties of the polymer of high vinyl alcohol content. There further exists a need for additive polymers which may be blended with polymers of high vinyl alcohol content to enhance their ability to form films and coatings with improved properties of the film or coating without much loss in barrier properties.

In recent U.S. Pat. No. 5,189,097 and European Unexamined Patent Application 567,327, La Fleur and co-workers have described the unexpected effect of relatively low levels of functionalized "acrylic" additives on the melt-processing of poly(vinyl alcohol). Although the modifiers of La Fleur et al. have solved many of the problems identified in processing poly(vinyl alcohol), there remains the need for further improvements in melt-processing a wide range of poly(vinyl alcohols) of varying compositions and molecular weights. Further, under certain conditions the functionalized core/shell modifiers can decrease the melt flow index (i.e., make the blend more viscous and harder to process and extrude).

We have discovered a means for meeting these needs by melt-blending the poly(vinyl alcohol) with certain core/shell polymers which do not contain acid functionality (or other functionality which can react with the poly(vinyl alcohol)) and further which do not contain expensive copolymerizable amide monomers. The discovery offers an alternate and less costly means for achieving a toughened melt-processed blend based on poly(vinyl alcohol). Thus, we have discovered a melt-processed blend comprising:

a) from 80 to 98 parts of at least one first polymer containing at least 80 mol %, preferably at least 88 mol %, of units of the structure

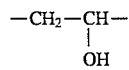

and optionally units selected from one or more of the following structures:

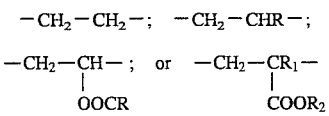

wherein R is methyl, $R_1$ is H or $CH_3$, and $R_2$ is an alkyleneoxy group, preferably wherein the viscosity of a 4% aqueous solution of the first polymer is at least 4 mPa s, more preferably at least 8 mPa s, and preferably wherein the acetate content of the first polymer is less than 0.88%; and (b) from 2 to 20 parts of a core/shell modifier comprising:
  (1) from 60 to 90 parts of a rubbery, crosslinked core comprising:
    (i) at least 75 weight percent of units derived from at least one of butadiene or an alkyl acrylate wherein the alkyl group contains from two to eight carbon atoms, preferably where the alkyl group is n-butyl;
    (ii) optionally up to 25 weight percent of units derived from at least one of an alkyl acrylate wherein the alkyl group contains from one to eight carbon atoms, styrene, or acrylonitrile;
    (iii) optionally up to 5 weight percent of units derived from at least one polyunsaturated monomer other than butadiene;
  (2) optionally up to about 15 parts of one or more intermediate shells comprising:
    (i) at least 51 weight percent of units derived from styrene or another vinyl aromatic monomer;
    (ii) optionally up to 49 weight percent of units derived from at least one alkyl (meth)acrylate wherein the alkyl group contains from one to eight carbon atoms;
    (iii) optionally up to 5 weight percent of units derived from at least one polyunsaturated monomer;
  (3) from 10 to 40 parts of a final shell comprising:
    (i) at least 51 weight percent of units derived from methyl methacrylate;
    (ii) optionally up to 49 weight percent of units derived from at least one of styrene or an alkyl (meth)acrylate other than methyl methacrylate wherein the alkyl group contains from one to eight carbon atoms;
    (iii) optionally up to 5 weight percent of units derived from at least one polyunsaturated monomer;

wherein no core or shell component of the core/shell modifier contains units derived from a functional monomer capable of reaction with the hydroxyl groups of the first polymer, and wherein no core or shell component of the core/shell modifier contains units derived from a copolymerizable monomer containing amide or cyclic amide groups.

In the following discussion, the term "parts" means parts per 100 parts by weight of the blend of the core/shell modifier and the poly(vinyl alcohol). Throughout the following description and claims, the term "units derived from" in reference to any chemical containing carbon-carbon double bonds, such as butadiene, methyl methacrylate, etc. shall mean the polymer so formed shall contain an unit resulting from free-radical homopolymerization or copolymerization occurring through the carbon-carbon double bond of the monomer or monomers named, all other functional groups in the monomer remaining unreacted.

To re-phrase the above statement of the invention, we have discovered a melt-processed blend consisting essentially of:

a) from 80 to 98 parts by weight, per 100 parts by weight of the polymeric blend, of at least one first polymer containing at least 80 mol % units of the structure

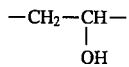

and optionally units selected from one or more of the following structures:

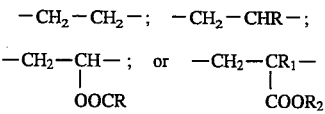

wherein R is methyl, R is H or $CH_3$, and $R_2$ is an alkyleneoxy group; and b) from 2 to 20 parts by weight, per 100 parts by weight of the polymeric blend, of a core/shell modifier consisting essentially of either (b.1) a crosslinked core/shell modifier consisting essentially of
 (1) from 60 to 90 parts by weight, per 100 parts by weight of the core/shell modifier, of a rubbery, crosslinked core consisting essentially of:
  (i) at least 75 weight percent of units formed by free-radical homopolymerization or copolymerization of at least one of butadiene or of an alkyl acrylate wherein the alkyl group contains from two to eight carbon atoms;
  (ii) optionally up to 25 weight percent of units formed by free-radical copolymerization of at least one of methyl acrylate, styrene, or acrylonitrile;
  (iii) optionally up to 5 weight percent of units formed by free-radical copolymerization of at least one polyunsaturated monomer other than butadiene;
 (2) optionally up to 15 parts by weight, per 100 parts by weight of the core/shell modifier, of one or more intermediate shells consisting essentially of:
  (i) at least 51 weight percent of units formed by free-radical homopolymerization or copolymerization of styrene;
  (ii) optionally up to 49 weight percent of units formed by free-radical copolymerization of at least one alkyl (meth)acrylate wherein the alkyl group contains from one to eight carbon atoms;
  (iii) optionally up to 5 weight percent of units formed by free-radical copolymerization of at least one polyunsaturated monomer;
 (3) from 10 to 40 parts by weight, per 100 parts by weight of the core/shell modifier, of a final shell consisting essentially of:
  (i) at least 51 weight percent of units formed by free-radical homopolymerization or copolymerization of methyl methacrylate;
  (ii) optionally up to 49 weight percent of units formed by free-radical copolymerization of at least one of styrene or an alkyl (meth)acrylate other than methyl methacrylate wherein the alkyl group contains from one to eight carbon atoms; by free-radical copolymerization of at least one polyunsaturated monomer; and/or (b.2) a non-crosslinked core/shell modifier consisting essentially of
 (1) from 10 to 60 parts by weight, per 100 parts by weight of the core/shell modifier, of a non-crosslinked core consisting essentially of at least 75 weight percent of units formed by free-radical homopolymerization or copolymerization of at least one alkyl acrylate wherein the alkyl group contains from two to eight carbon atoms;
 (2) from 40 to 90 parts by weight, per 100 parts by weight of the core/shell modifier, of one or more shells consisting essentially of at least 70 weight percent of units formed by free-radical homopolymerization or copolymerization of methyl methacrylate;

wherein no core or shell component of the core/shell modifier contains units formed by free-radical copolymerization of a functional monomer capable of reaction with the hydroxyl groups of the first polymer, and wherein no core or shell component of the core/shell modifier contains units formed by free-radical copolymerization of a copolymerizable monomer containing amide or cyclic amide groups.

Even more preferably the first polymer contains at least 95 mol % units of the "vinyl alcohol" structure, i.e.,

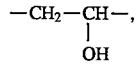

and most preferably contains 98% or more of such units. The optional units in the vinyl alcohol copolymers are preferably those derived from ethylene or vinyl acetate.

The first polymer preferably should exhibit a low content of acetate ions, such as sodium acetate. The sodium content (or general salt content) may be measured with a Varian AA 300 Atomic Absorption Spectrometer or a similar device. The content may be low as received from the supplier, or it may be decreased by washing the first polymer, or the acetate content may be lowered by treatment with phosphoric acid, as in U.S. Pat. No. 3,425,979, which converts the acetate to acetic acid, which is vented during the melt processing.

In the core/shell modifier, the rubbery, crosslinked core preferably contains at least 75 weight percent, preferably at least 95 weight percent, of units derived from butadiene or from butyl acrylate. Units derived from other alkyl acrylates, styrene, or acrylonitrile are preferably at levels of 5 weight percent or less. It is generally preferred to have present one or more polyunsaturated monomers other than butadiene, and the preferred amount is from 0.5 to 2 weight percent. The polyunsaturated monomers may contain two or more sites of unsaturation of equivalent reactivity, as illustrated by ethylene glycol dimethacrylate, trimethylolpropane triacrylate, divinylbenzene, and the like, or may contain two or more sites of unequal reactivity, as illustrated by allyl methacrylate, diallyl maleate, and the like.

It is not necessary that one or more intermediate shells be present, but some commercially available core/shell impact modifiers, designed for modification of other thermoplastics such as poly(vinyl chloride) or poly(ethylene terephthalate) and the like, may contain such intermediate shells.

For isolation of most core/shell polymers in powdery form, it is usually necessary to have present at least 10 weight percent of the final shell, usually 20 to 40 weight percent of the final shell, in the core/shell polymer. Higher levels may be present in the additive component of the present invention, but are not necessary for obtaining the desired melt processability and dilute the ability of the modifier to toughen the blend. It is preferred to have methyl methacrylate the majority component of the final shell for ease of isolation, but the presence of other co-monomers in the final shell may lead to improved fusion in the melt-blending operation.

For certain formulations, especially those where no plasticizer is present, the additive may be added in emulsion form and the water removed by evaporation during the compounding process, by such means as evaporation or vacuum devolatilization.

If addition of a low level of plasticizer, such as glycerine, is desired, precompounding of the powders by such means as Henschel mixing or a Banbury mixer, is desirable to obtain complete mixing. Although glycerol may lower the glass temperature of the final blend, it can aid in obtaining better admixture of the two components, so as to avoid presence of gel or requirement of extensive melt-mixing.

As noted, the core or shell(s) of the core/shell modifier useful in the present invention do not contain units derived from a copolymerizable monomer containing amide or cyclic amide functionality, so that the modifier does not contain, e.g., units derived from vinyl pyrrolidone, (meth-)acrylamide, N-vinyl acetamide, and the like. Further, the core/shell modifier does not contain reactive functionality, that is, does not contain units derived from a functional monomer capable of reaction with the hydroxyl groups of the first polymer, such as glycidyl methacrylate, methacrylic acid, acrylic acid, maleic anhydride, and the like.

We also have found that certain core/shell polymers, known to be useful as processing aids for poly(vinyl chloride), are surprisingly useful for obtaining melt-processed poly(vinyl alcohol). Such core/shell polymers differ from the core/shell impact modifiers described previously, in that the core is: (a) not cross-linked; (b) not necessarily rubbery in nature; (c) present at a lower level, usually 10 to 60 weight percent of the total modifier, than in an impact modifier, where the core is 60–90% of the total modifier. Specifically we have found a melt-processed blend comprising:

a) from 80 to 98 parts of at least one first polymer containing at least 88 mol % units of the structure

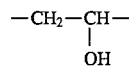

and optionally units selected from one or more of the following structures:

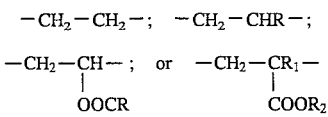

wherein R is methyl, R1 is H or $CH_3$, and $R_2$ is an alkyleneoxy group,; and (b) from 2 to 20 parts of a core/shell modifier comprising:
  (1) from 10 to 60 parts of a non-crosslinked core comprising at least 75 weight percent of units derived from at least one alkyl acrylate wherein the alkyl group contains from two to eight carbon atoms;
  (2) from 40 to 90 parts of one or more shells comprising at least 70 weight percent of units derived from methyl methacrylate;

wherein no core or shell component of the core/shell modifier contains units derived from a functional monomer capable of reaction with the hydroxyl groups of the first polymer, and wherein no core or shell component of the core/shell modifier contains units derived from a copolymerizable monomer containing amide or cyclic amide groups.

Typical of such polymers, which can readily be prepared by emulsion synthesis using well-known techniques of staged addition of monomers under conditions where no new particles are formed and the second or "shell" polymer is formed at or near the surface of the core particles. Illustrative of such modifiers is a core/shell polymer of 50–60 parts of poly(butyl acrylate/styrene/methyl methacrylate (78/18/4) core //40–50 parts of methyl methacrylate/butyl acrylate/styrene (92/4/4) wherein the molecular weight of the core is kept below ca. 300,000 daltons by the presence of n-dodecyl mercaptan; such polymers are taught in Carty et al., U.S. Pat. No. 4,086,296. A second type of polymer illustrative of such modifiers is a core of poly(ethyl acrylate) 25 parts//75 parts of a shell of methyl methacrylate/ethyl acrylate (75/25), the shell being of MW ca. 700,000 daltons, the first stage preferably having a glass temperature below 60° C., as taught in Grochowski et al., U.S. Pat. No. 3,833,686. Neither patent teaches or suggests the utility of such core/shell polymers for preparing a melt-processed blend of poly(vinyl alcohol).

The first polymer in such blends may be a blend of more than one polymer containing vinyl alcohol units, such as those of differing molecular weight. The first polymer, containing vinyl alcohol units, may be washed or be neutralized with acid such as phosphoric acid to remove residual sodium acetate, as taught in U.S. Pat. No. 3,425,979. The art teaches that sodium acetate from the alkaline hydrolysis of the copolymerized vinyl acetate accelerates the formation of conjugated species and chemical cross-links upon heating the polymer containing vinyl alcohol units to within a few degrees of its melting temperature. Washing to lower the level of sodium acetate to below about 0.1 weight percent, or treatment with an acid such as phosphoric acid, whose sodium salt is not deleterious to degradation of the polymer containing vinyl alcohol units, produces a polymer of enhanced thermal stability which allows more flexibility in the choice of blending conditions of the acrylic additive in the melt-processable blend. When the acid treatment is used, the acetic acid formed is removed in the extrusion process by appropriate venting. In both treatments, essentially all of the sodium acetate is removed, so that the content of sodium acetate is less than about 0.1 wt. percent, based on the polymer containing vinyl alcohol.

Blending of the two polymers may be carried out most conveniently by dry mixing the finely granulated polymer particles prior to melt compounding in a single- or twin-screw extruder. In the process of dry blending, small quantities of additives may be added to the mixture of particulates for the purpose of improving the physical properties of the blend. Examples of additives may include one or more of the following classes of compounds: antioxidants, ultraviolet light absorbers, plasticizers, antistatic agent, slip agents, coloring agents, fillers and other compounds. Further, fugitive plasticizers, such as water in amounts about 3%, may be added to aid in compounding and processing the blend.

The blend containing the non-crosslinked acrylic additive may further be prepared by admixing the additive polymer in emulsion form, when an emulsion polymerization is a feasible way to prepare the additive polymer, with the poly(vinyl alcohol) in solid form, and then processing directly with water removal such as by extrusion in a vented extruder, or by drying the powder blend under vacuum, and then blending with the matrix polymer.

The blend may further contain glycerol in small amounts. Although glycerol may lower the glass temperature of the final blend, it can aid in obtaining better admixture of the two components, so as to avoid presence of gel or requirement of extensive melt-mixing.

The blend may further contain functionalized impact modifiers known to the art, such as multistage polymers based on a poly(acrylate) first stage or a polybutadiene first stage and a methacrylate or styrene second stage, which may be present as a shell or in separate domains within the core, and where at least one stage will contain acid-functional groups, or other reactive sites, such as glycidyl groups.

The blends of the present invention may be considered as a polymer containing vinyl alcohol units modified with a processing aid, since the acrylic copolymer additive enables the poly(vinyl alcohol) to be melt-processed with a reduced tendency towards thermal decomposition, and aids in the formation of melt-processable objects or melt-processable intermediates, such as pellets.

All of the above melt-processed blends are useful in many applications. When the vinyl alcohol polymer is water-soluble, a film from the blends can be broken down in water for ready disposal. Such blends in film form may also be useful as containers for toxic, corrosive, or skin-sensitizing chemicals which are to be used in water, such as agricultural chemicals to be sprayed. The blends in film form such as in blown film, are useful as high gas barrier films for packaging, especially of food. The films from the blends can be laminated onto substrates to form useful barrier structures for containment or packaging of food or beverages. The blends in container form, such as film, bottles, and the like may be used to exclude gases such as oxygen or to contain gases such as carbon dioxide. Blends with improved heat distortion properties may be useful in hot fill packaging or in retortable or sterilizable container packaging. The blends or laminates may also be useful in museum and other glazing where clarity and long-term retention of an inert atmosphere are desired. The blends may also be useful in bags for medical laundry, and for lamination of films to paper. The blends of the present invention may be used to form useful fibers. The blends may be processed from the melt or from a solvent-swollen gel. The melt-processable blends may be passed through an appropriate die to form filaments which may be stranded into single or multi-stranded fibers of various thicknesses. The fibers may then be further processed into appropriate products, such as packaging materials, water-soluble disposable cloths, such as diapers, and the like. The fibers may be post-treated after forming by chemicals which will insolubilize the poly(vinyl alcohol), and the resulting fibers may be processed into articles with high moisture uptake which do not dissolve in water. Further, the polymers may be spun by a solid state process wherein the fiber is oriented in the solid state to produce a fiber with a very high tensile modulus.

Films from the present blends may be laminated, co-extruded, or co-injection molded to form laminated structures with a good combination of clarity, toughness, and barrier properties. For example, a blend may be co-extruded with poly(ethylene terephthalate) (PET), with poly(methyl methacrylate), with poly(vinyl chloride), or with polycarbonate, to form continuous laminated film with good adhesion between the layers. The co-extruded film with PET can be thermoformed into useful objects without delamination. Multi-layer laminates may also be formed.

The blends may also be injection-molded into useful objects. It should be noted that at additive levels below 6 parts, any external lubricant, such as polyethylene wax, should be avoided or used at lower levels than those shown for mill-mixed or calendered formulations, so that adequate fusion will be obtained in the extruder compounding prior to injection molding.

The blends are also suitable for calendering, profile extrusion, foam extrusion, and extrusion blow molding into useful articles, either in film or as thicker articles.

EXAMPLES

General:

The following poly (vinyl alcohol)s are used in the study. Viscosity measurements are made at 20 ° C by DIN 1342 using a capillary viscometer DIN 52562 and DIN 53012.

| Trade Name | Designation | Supplier | % PVOH | Visc., 4% mPa s | MP, °C. |
|---|---|---|---|---|---|
| Mowiol | 010–98 | Hoechst | 98 | 7.7 | 226 |
| ELVANOL | 9050 | DuPont | 98 | 12.4 | 226 |
| AIRVOL | 107 | Air Products | 98 | 5.23 | 223 |
| AIRVOL | 710 | Air Products | 98 | 8.2 | 220 |
| AIRVOL | 6108 | Air Products | 88 | 6.9 | 175 |
| Rhodoviol | 008/20 | Rhone Poulenc | 88 | 3.53 | 177 |
| Rhodoviol | 004/125 | Rhone Poulenc | 98 | 8.64 | 220 |

The following additives are used in the study:

Additive A: A core/shell (75//12.5//12.5) polymer of a butadiene/styrene 95/5 rubber (with 1% divinylbenzene)//styrene//methyl methacrylate/butylene glycol dimethacrylate (99/1 ); stabilized with a combination of hindered phenol antioxidants and tris(nonylphenyl)phosphite. This additive is in within the present invention.

Additive B: A core/shell (70//30)polymer of a butadiene/styrene 95/5 rubber (with 1% divinylbenzene)//methyl methacrylate/butyl acrylate/methacrylic acid (60/30/10); stabilized with a combination of hindered phenol antioxidants as taught in U.S. Pat. No. 5,164,434. This additive is not within the present invention.

Additive C: Tetrapolymer of methyl methacrylate 55/ethyl acrylate 10/N-vinylpyrrolidone 25/methacrylic acid 2 of MW ca. 50,000, prepared by methods similar to that of Example 37 of U.S. Pat. No. 5,189,097. This additive is not within the present invention.

Additive G: A core/shell (80//20) polymer of a butyl acrylate/trimethylolpropane triacrylate/allyl methacrylate (99/0.5/0/5) rubber//methyl methacrylate (100) containing 1% calcium stearate-coated calcium carbonate. This additive is within the present invention.

Other components:

Wax D: polyethylene wax $H_3PO_4$: 85% concentration

Processing Aid E: a butyl acrylate/styrene (82/18)//methyl methacrylate core/shell (50/50) copolymer, non-crosslinked.

Antioxidant F: tetrakis(methylene(3,5-di-t-butyl-4hydroxyhydrocinnamate)) methane Test Procedures: The Brabender Plasticorder is used for compounding. Typical compounding conditions are 70 RPM speed, 210° C. setting temperature, with variable mixing times. A pre-blend of PVOH and additive in powder form is placed in the mixing bowl. Fusion is judged visually, as is color development.

Several formulations are milled on a two-roll mill to observe fusion, dispersion, color and sticking.

A few formulations are tested on the Werner-Pfleiderer twin screw extruder, D=30 MM., L=26×D). Melt flow index values are determined on a CEAST melt flow index (MFI) apparatus at either 240° C. or 270° C., with a load of 2.16 kg. and a die of 3.1 mm. Results are reported as grams/10 minutes.

Some formulations compounded on the Werner-Pfleiderer are then injection molded on an Arburg 50T injection-molding machine. A mold designed for crystalline resins is used; it has 7 cavities, including a plaque of size 8×10×0.32 cm. The barrel temperature is 230° C. and the mold temperature 100° C.

EXAMPLE 1

This Example demonstrates the ability of Additive A to cause melt fusion of the blend with a poly(vinyl alcohol) with results very similar to a functionalized additive taught by La Fleur et al., and with improved fusion results under these test conditions over a tetrapolymer composition also taught as effective by La Fleur et al. Melt flow rates are reported after 1 minute and two minutes of processing; flow temperature is 270° C. Note Additive A exhibits significantly better flow than the functionalized core/shell copolymer (Additive B).

| Formulation | Ex. 1A | Ex. 1B | Ex. 1C | Ex. 1D |
| --- | --- | --- | --- | --- |
| Mowiol 10–98 | 97.8 | 88.1 | 87.4 | 87.5 |
| Additive A | | 9.8 | | |
| Additive B | | | 9.7 | |
| Additive C | | | | 9.7 |
| Wax D | 1.6 | 1.6 | 2.3 | |
| Processing Aid E | 0.6 | 0.6 | 0.6 | 0.6 |
| H3PO4 | | | | 0.6 |
| Fusion | NO | YES | YES | NO |
| Comments | WHITE | V. GOOD | V. GOOD | YELLOW |
| MFI, 1 min. | 15 | 6.5 | 1.2 | 1 |
| MFI, 2 min. | 8 | 2.5 | 0.6 | 0.4 |

EXAMPLE 2

This Example illustrates the improved mill-roll processing of the core/shell additive (A) in terms of color and sticking versus the additives taught by La Fleur et al.

| Formulation | Ex. 2A | Ex. 2B | Ex. 2C | Ex. 2D |
| --- | --- | --- | --- | --- |
| Mowiol 10–98 | 98.8 | 92.6 | 88.9 | 88.9 |
| Additive A | | 5.3 | | |
| Additive B | | | 9.9 | |
| Additive C | | | | 10 |
| Wax D | 1.2 | 2.1 | 1.2 | |
| Processing Aid E | 0.6 | | | |
| H3PO4 | | | | 0.1 |
| Fusion | YES | YES | YES | YES |
| Comments | STICKING | NO STICKING | NO STICKING | STICKING |
| Roll temp., °C. | 230 | 230 | 230 | 230 |
| Color | OK | V. GOOD | GOOD | OK |

EXAMPLE 3

This Example exhibits the improved processing in a twin-screw extruder over one of the additive polymers taught by La Fleur. In all extrusions, the product is cooled with air, the RPM of the extruder is 150 RPM, and the temperature setting over five zones is (in degrees C.) 235/230/225/225/245 at a feed of 7 kg./hour. Formulation 3-A is tried first. Fusion occurs and a white product is obtained. The final zone temperature could be lowered to 225° C. with production of white pellets.

With formulation 3-B at 235/230/225/225/225, good fusion is obtained. Formulation 3-C does not fuse over a range of processing conditions, although in a separate experiment under conditions similar to Example 3-B, fusion was observed. The reason for the non-reproducibility is unknown.

| Formulation | Ex. 3A | Ex. 3B | Ex. 3C |
| --- | --- | --- | --- |
| Mowiol 10–98 | 87.9 | 91.8 | 87 |
| Additive A | 9.9 | 6 | |
| Additive C | | | 10.3 |
| Wax D | 1.6 | 1.7 | |
| Processing Aid E | 0.6 | 0.6 | |
| H3PO4 | | | 0.06 |
| Antioxidant F | | | 0.54 |
| Glycerol | | | 10 |

EXAMPLE 4

This Example demonstrates that Additive A is less prone to cause good fusion and avoid burning than Additive B in a PVOH of similar molecular weight and degree of hydrolysis, but of higher residual acid content, although it is of equivalent effectiveness to Additive C, as taught by La Fleur. It should be noted that these formulations (Examples B and C) contain quite high levels of wax, which, although preventing sticking, may have contributed to poorer mixing and thus poorer fusion.

| Formulation | Ex. 4A | Ex. 4B | Ex. 4C | Ex. 4D |
|---|---|---|---|---|
| AIRVOL 710 | 97 | 87.1 | 87.1 | 93 |
| Additive A |  | 9.9 |  |  |
| Additive B |  |  | 9.9 |  |
| Additive C |  |  |  | 4 |
| Wax D |  | 2.4 | 2.4 |  |
| Processing Aid E |  | 0.6 | 0.6 |  |
| Antioxidant F | 0.5 |  |  | 0.5 |
| Glycerol | 2 |  |  | 2 |
| H3PO4 | 0.6 |  |  | 0.6 |
| Fusion | NO | BAD | YES | BAD |
| Comments |  | BURNED |  | YELLOW |

EXAMPLES 5–8

In similar formulations as shown for Additives B and C, the following relative ratings were made for various PVOHs. A107-E refers to a approximately equal weight of AIRVOL 107 and the ELVANOL PVOH. To define the 1–4 ratings (very good fusion/color; good fusion/color; some fusion some color; poor in fusion and/or color), see Examples 1 and 4. All samples were tested on the Brabender as in Example 1.

| EXAMPLE | Trade Name | Designation | Additive A | Additive B | Acetate Level |
|---|---|---|---|---|---|
| 1 | Mowiol | 010–98 | 1 | 1 | 0.11 |
| 5 | AIRVOL | 6108 | 2 | 1 | 0.8 |
| 6 | Rhodoviol | 004/125 | 2 | 2 | 0.13 |
| 7 | A107-E | mix | 3 | 2 | 1.1 |
| 4 | AIRVOL | 710 | 4 | 2 | 1.17 |
| 8 | Rhodoviol | 008/20 | 4 | 2 | 0.88 |

Again, in those blends with the non-functionalized additive, it is believed that a lowering of the wax content and/or an addition of phosphoric acid sufficient to neutralize the acetate will improve the fusion behavior of the blend.

EXAMPLE 9

This Example illustrates the ability of a core/shell polymer with a non-crosslinked core to be combined with poly(vinyl alcohol) to yield a melt-processable blend. A blend of PVOH of approximately equal weight of ELVANOL 9050 and AIRVOL 107 (80 parts) is admixed with 10 parts of glycerol and 10 parts of an acrylic core-shell modifier with a core of poly(ethyl acrylate) 25 parts and 75 parts of a shell of methyl methacrylate/ethyl acrylate (75/25), the shell being of MW ca. 700,000 daltons, prepared in emulsion as taught in U.S. Pat. No. 3,833,686, and isolated by spray-drying.

The blend may be processed in equipment such as a single-stage Killion extruder a single screw Killion extruder at temperatures of 200° to 216° C. to yield a melt-processable blend which could be pelletized. The resultant blend may be reprocessed in a similar extruder equipped with an appropriate die and blow-up equipment to yield a coherent thin film.

EXAMPLE 10

This Example illustrates the ability of a core/shell polymer with a cross-linked core of an alkyl acrylate rubber to yield a melt-processable blend. The formulation of Example 1-B is utilized, but Additive G replaces Additive A. The mixture of powders is compounded on a two-mill roll set at 230° C. Fusion occurs after 45 seconds. The melt-processed blend is readily removed from the mill in the form of a thin film. From experience with similar films, it is fully expected that the resulting film could be calendered on conventional equipment into a useful packaging film of uniform thickness.

EXAMPLES 11–12

These Examples illustrates that the melt-processed blends may be molded into useful objects. The blends shown as Examples 11 and 12 are blended on a twin-screw extruder and then injection-molded as described above to yield molded objects of good appearance.

| Formulation | Ex. 11 | Ex. 12 |
|---|---|---|
| Mowiol 10–98 | 90 | 94 |
| Additive A | 10 | 6 |
| Wax D | 1.6 | 1.6 |
| Processing Aid E | 0.6 | 0.6 |

EXAMPLE 13

This Examples illustrates that a core/shell polymer based on an butyl acrylate rubbery core. A blend of Mowiol 10-98 poly(vinyl alcohol) 90 parts, Additive G 10 parts, Wax D, 2.4 parts, and Processing Aid E 0.72 parts is blended on a two-roll mill at a roll temperature of 230° C. and a speed of 26 rpm. Fusion time is 30–45 seconds. The rolling bank is smooth, there is good resistance to sticking to the mill, and the blend color is white. By visual observation, the melt strength is adequate for further processing, such as calendering.

We claim:

1. A melt-processed blend consisting essentially of:
   a) from 80 to 98 parts by weight, per 100 parts by weight of the polymeric blend, of at least one first polymer containing at least 80 mol % units of the structure $$-CH_2-CH-;$$
$$\quad\quad\quad\quad |$$
$$\quad\quad\quad\quad OH$$

and
   b) from 2 to 20 parts by weight, per 100 parts by weight of the polymeric blend, of a core/shell modifier consisting essentially of either
      (b.1) a crosslinked core/shell modifier consisting essentially of
         (1) from 60 to 90 parts by weight, per 100 parts by weight of the core/shell modifier, of a rubbery, crosslinked core consisting essentially of:
            (i) at least 75 weight percent of units formed by free-radical homopolymerization or copolymerization of at least one of butadiene or of an alkyl acrylate wherein the alkyl group contains from two to eight carbon atoms;
(ii) optionally up to 25 weight percent of units formed by free-radical copolymerization of at least one of methyl acrylate, styrene, or acrylonitrile;
(iii) optionally up to 5 weight percent of units formed by free-radical copolymerization of at least one polyunsaturated monomer other than butadiene;
(2) optionally up to 15 parts by weight, per 100 parts by weight of the core/shell modifier, of one or more intermediate shells consisting essentially of:
(i) at least 51 weight percent of units formed by free-radical homopolymerization or copolymerization of styrene;
(ii) optionally up to 49 weight percent of units formed by free-radical copolymerization of at least one alkyl (meth)acrylate wherein the alkyl group contains from one to eight carbon atoms;
(iii) optionally up to 5 weight percent of units formed by free-radical copolymerization of at least one polyunsaturated monomer;
(3) from 10 to 40 parts by weight, per 100 parts by weight of the core/shell modifier, of a final shell consisting essentially of:
(i) at least 51 weight percent of units formed by free-radical homopolymerization or copolymerization of methyl methacrylate;
(ii) optionally up to 49 weight percent of units formed by free-radical copolymerization of at least one of styrene or an alkyl (meth)acrylate other than methyl methacrylate wherein the alkyl group contains from one to eight carbon atoms;
(iii) optionally up to 5 weight percent of units formed by free-radical copolymerization of at least one polyunsaturated monomer; and/or
(b.2) a non-crosslinked core/shell modifier consisting essentially of
(1) from 10 to 60 parts by weight, per 100 parts by weight of the core/shell modifier, of a non-crosslinked core consisting essentially of at least 75 weight percent of units formed by free-radical homopolymerization or copolymerization of at least one alkyl acrylate wherein the alkyl group contains from two to eight carbon atoms;
(2) from 40 to 90 parts by weight, per 100 parts by weight of the core/shell modifier, of one or more shells consisting essentially of at least 70 weight percent of units formed by free-radical homopolymerization or copolymerization of methyl methacrylate;

wherein no core or shell component of the core/shell modifier contains units formed by free-radical copolymerization of a functional monomer capable of reaction with the hydroxyl groups of the first polymer, and wherein no core or shell component of the core/shell modifier contains units formed by free-radical copolymerization of a copolymerizable monomer containing amide or cyclic amide groups.

2. The melt-processed blend of claim 1 wherein the first polymer contains at least 88 mol % of units of the structure

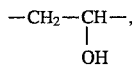

wherein the viscosity at 20° C. of a 4% aqueous solution of the first polymer is at least 4 mPas, and wherein the acetate content of the first polymer is less than 0.88%.

* * * * *